June 16, 1942. J. M. NAUL 2,286,993
FIELD-CORE HOLDING MEANS FOR ELECTRIC MOTORS
Filed Oct. 11, 1940

Witness:
John H. Cave

Inventor
James M. Naul
By John F. Hine
Attorney

Patented June 16, 1942

2,286,993

UNITED STATES PATENT OFFICE 2,286,993

FIELD-CORE HOLDING MEANS FOR ELECTRIC MOTORS

James M. Naul, Fanwood, N. J., assignor to The Singer Manufacturing Company, Elizabeth, N. J., a corporation of New Jersey Application October 11, 1940, Serial No. 360,741

11 Claims. (Cl. 172—36)

This invention relates to electric motors and more particularly to fractional horse-power motors of the type having a moulded casing made of heat- and electric-insulating material such as "Bakelite" or other phenolic condensation product.

The invention has as a primary object to provide improved and simplified means for rigidly securing the laminated field-core of the motor in the moulded motor casing without imposing on the motor casing any strains or stresses which might result in impairment of the casing.

This object has been attained by the provision of a field-core securing means which imposes on the moulded casing only compression forces, which forces the moulded material is well able to withstand.

With the above and other objects in view, as will hereinafter appear, the invention comprises the devices, combinations, and arrangements of parts hereinafter set forth and illustrated in the accompanying drawing of a preferred embodiment of the invention, from which the several features of the invention and the advantages attained thereby will be readily understood by those skilled in the art.

Figure 1:
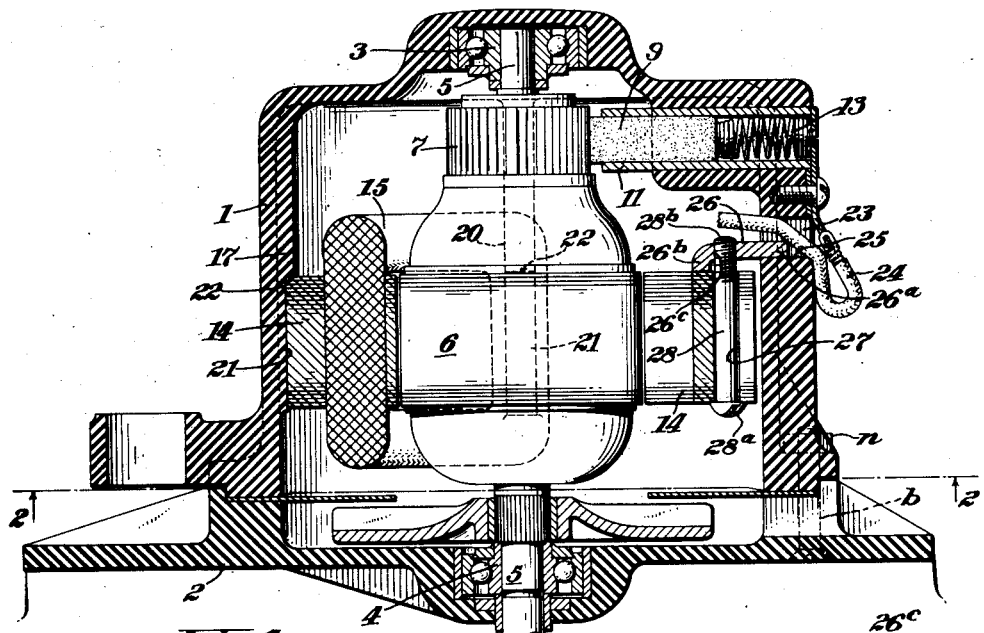
Fig. 1 is a vertical sectional view, taken on the angular line 1—1 of Fig. 2, of an electric motor embodying the present invention.
Figure 3:
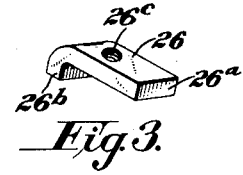
Fig. 3 is a detail perspective view of a field-core clamping element, later to be described, which forms a part of the present invention.

Referring more specifically to the drawing, the invention is disclosed as embodied in an electric motor comprising a main housing which consists of a one-piece casing 1 of inverted cup-like form and a bottom end-cap 2 secured to and substantially closing the lower or rim end of the casing 1. The cap 2 is secured to the casing by means of bolts $b$ passing through apertures in the two parts and having threaded thereon nuts $n$. Both the casing 1 and the end-cap 2 are preferably made of moulded heat- and electric-insulating material such as "Bakelite" or other phenolic condensation product which has relatively high compression strength although relatively low tensile and shearing strength.

Figure 2:
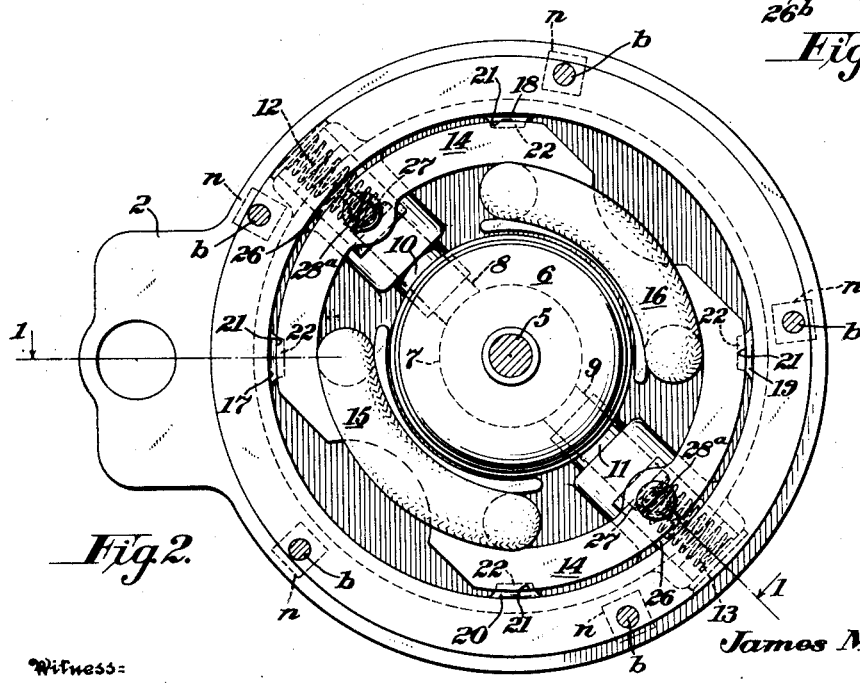
Fig. 2 is a horizontal sectional view substantially on the line 2—2 of Fig. 1.

The casing 1 and the cap 2 support antifriction bearings 3 and 4, respectively, in which is journaled an armature shaft 5 which carries a conventional armature 6 and commutator 7. Engaging the commutator, at diametrically opposite sides thereof, as shown in Fig. 2, are two carbon brushes 8 and 9, slidingly mounted in tubes 10 and 11, respectively, secured within the moulded motor casing 1. The brushes are urged endwise, into contact with the commutator, by coil springs 12 and 13 as is well understood.

Secured within the casing 1, by means later to be described, is a laminated field-core 14 which surrounds the armature 6 and upon which are mounted field-coils 15 and 16.

The improved means for securing the field-core in the moulded motor casing without subjecting the casing, or any part thereof, to excessive or destructive stresses will now be described. Moulded within the motor casing 1, at substantially equally spaced points are four inwardly extending longitudinal ribs 17, 18, 19 and 20. The rib 17 is shown in section in Fig. 1. Each rib is formed with a substantially circumferential face 21 which engages the outer periphery of the laminations of the field-core to prevent lateral movement of the core in the casing, and an overlying step or abutment shoulder 22 against which the under side of which the upper lamination of the field-core abuts. See Fig. 1.

At opposite sides of the casing 1, below the brush tubes 10 and 11, the side wall of the casing is formed with apertures 23 (one being shown in Fig. 1) through which extend wires 24 which are connected to the motor brushes. Each of these apertures affords a horizontally disposed wall or abutment surface 25 adapted to be engaged by the longer leg 26$^a$ of an L-shaped clamp element or lever 26 having a shorter, downturned leg 26$^b$ adapted to bear upon the upper lamination of the field-core, as shown in Fig. 1. The abutment surfaces 25 face oppositely to the shoulders 22, for a purpose later to be described. Passing through apertures 27 in the laminated field-core 14 are two clamp-screws 28, the heads 28$^a$ of which engage the lower lamination of the field-core and the upper ends 28$^b$ of which are threaded into apertures 26$^c$ the clamp elements 26.

It will readily be perceived that when the field-core 14 is inserted into the casing 1 with the upper lamination thereof in contact with the downwardly facing abutment shoulders 22 of the ribs 21, and the screws 28 are threaded into the clamp-levers 26, tightening of the screws will cause the clamp-levers 26 to fulcrum about the point of contact of the legs 26$^b$ with the upper lamination of the field-core, thus swinging the legs 26$^a$ downwardly into pressure contact with the upwardly facing abutment surfaces 25 of the apertures 23 in the casing and simultaneously therewith compressing the laminated field-core and forcing it upwardly into pressure contact with the shoulders 22 in the casing 1, thereby rigidly and securely clamping the field-core in the casing. It is to be observed that the abutment shoulder 22 and abutment surface 25, which receive the oppositely directed thrusts caused by the action of the clamps 26 and screws 28, are provided by solid walls which extend to the opposite ends of the casing 1 and therefore the stresses imposed thereon cannot result in breaking of any parts from the wall of the casing as they might do if they were provided by projecting lugs or the like. In other words the forces transmitted to the motor casing are merely compression forces, as distinguished from shearing forces, which compression forces the casing is well able to withstand.

From the foregoing it will be apparent that this invention has provided a simple yet efficient means for rigidly securing the field-core in a moulded motor casing without subjecting the casing or other parts of the motor to stresses which might be detrimental thereto.

While this invention has been shown and described in connection with a motor having its axis arranged in a vertical plane, it is to be understood that the invention is not limited to that type of motor but is equally adaptable to motors having their axes in a horizontal or other planes.

Having thus set forth the nature of the invention, what I claim herein is:

1. An electric motor comprising a casing, abutment surfaces provided by said casing, a plurality of longitudinal ribs formed within said casing, a shoulder provided by each rib, a field-core located within said casing and in contact with said shoulders, and means for clamping said field-core against said shoulders comprising clamping elements each having one end in contact with one of said abutment surfaces and its opposite end in contact with said field-core, and screw means engaging said clamp elements and said field-core for forcing said field-core into contact with said shoulders.

2. An electric motor comprising a casing the side walls of which are provided with apertures, walls of which afford abutment surfaces, a plurality of ribs formed within said casing, a shoulder provided by each rib, said shoulders being disposed oppositely to said abutment surfaces, a field-core located within said casing and in contact with said shoulders, and means for clamping said field-core against said shoulders comprising clamping elements each having one end in contact with one of said abutment surfaces and its opposite end in contact with said field-core, and clamp-screws passing through said field-core and threaded into said clamping elements and exerting oppositely directed forces on said field-core and clamping elements to force said field-core against said shoulders.

3. An electric motor comprising a casing of moulded electric insulating material having a plurality of abutment surfaces, a plurality of longitudinal ribs moulded integrally with said casing on the inner surface thereof, said ribs being formed with aligned abutment shoulders, a field-core located within said casing, and means for maintaining said field-core in contact with said shoulders, said means including a plurality of clamp elements, each engaging one of said abutment surfaces and said field-core, and screws extending through said field-core with the heads thereof acting against said field-core and the other ends thereof threaded into said clamp elements.

4. An electric motor comprising a casing of moulded electric insulating material having in the side walls thereof a plurality of apertures a wall of each of which affords an abutment surface, a plurality of longitudinally extending ribs moulded integrally with said side wall, each of said ribs having a circumferential face and an abutment shoulder, the abutment surfaces of the wall and abutment shoulders of the ribs facing in opposite directions, a field-core located within said casing and having its periphery in contact with the circumferential faces of said ribs and one of its faces in contact with said abutment shoulders, a plurality of clamping elements each having one end engaging one of said abutment surfaces and its other end in contact with that face of said field-core which engages said shoulders, and clamp-screws each having one end threaded into one of said clamp elements and its other end engaging the opposite face of said field-core to force the field-core against said shoulders.

5. In an electric motor having a casing of moulded electric insulating material provided with abutment walls and internal longitudinal ribs affording abutment shoulders, said walls and shoulders facing in opposite directions, a field-core located within said casing and having one face in contact with said shoulders, means for clamping said field-core against said shoulders comprising a plurality of clamp elements each adapted to engage one of said abutment walls and that face of the field-core which engages said shoulders, and clamp-screws passing through said field-core and threaded into said clamp elements adapted to draw said clamp elements into contact with said field-core and said abutment surfaces and to force said field-core into contact with said abutment shoulders.

6. A field-core holding means for electric motors having a moulded casing of electric insulating material the side wall of which affords a radially disposed abutment surface and a plurality of radially disposed abutment shoulders, said abutment surface and abutment shoulders facing in opposite directions, and a field-core within said casing and in contact with said shoulders, comprising a substantially L-shaped clamping element having its longer leg in contact with said abutment surface and its shorter leg in engagement with that face of the field-core which is in contact with said shoulders, and a clamp-screw extending through said field-core and threaded into said clamp element between its point of engagement with said casing and said field-core to draw said element into contact with said field-core and abutment surface and to force said field-core into contact with said shoulders.

7. An electric motor comprising a casing having oppositely facing abutment surfaces, a field-core located within said casing and having one face in contact with a first one of said abutment surfaces, a field-core clamping lever within said casing having one portion engaging a second one of said abutment surfaces and another portion engaging that face of the field-core which is in contact with the first abutment surface, and screw means engaging said field-core and said clamping lever to force said field-core against said first abutment surface and said clamping lever against said field-core and against said second abutment surface.

8. In an electric motor having a casing provided with a plurality of sets of oppositely facing abutment surfaces and a field-core within said casing and having one face in contact with a first set of said abutment surfaces, means to clamp said field-core against said first set of abutment surfaces comprising a plurality of clamp-levers of the third order each engaging, at one end, one of the abutments of the second set and, at its opposite end, that face of the field-core which contacts with the first set of abutment surfaces, and clamp-lever actuating screws each having its headed end acting on the opposite face of said field-core and its other end threaded into one of said clamp-levers.

9. In an electric motor having a field-core and a casing provided with a field-core abutment and clamp-lever abutments, means to clamp said field-core against said field-core abutment comprising a plurality of clamp-levers engaging said field-core and said clamp-lever abutments, and screw means reacting on said field-core and engaging said clamp-levers to operate the latter.

10. In an electric motor having a field-core and a casing provided with a field-core abutment and clamp-lever abutments, means to clamp said field-core against said field-core abutment comprising a plurality of clamp-levers engaging said field-core and said clamp-lever abutments, and screw means applied to said field-core and said clamp-levers to relatively move the field-core and its casing in opposite directions and tighten the field-core against said field-core abutment.

11. In an electric motor having a field-core and a cup-shaped casing element provided internally with a field-core abutment and clamp-lever abutments, means to clamp said field-core against said field-core abutment comprising a plurality of clamp-levers each engaging the inner face of the field-core and a respective one of said clamp-lever abutments, and screws applied to said field-core and threaded into said levers, said screws being operable through the rim end of said cup-shaped casing element.

JAMES M. NAUL.